United States Patent
Nayak et al.

(10) Patent No.: US 10,574,580 B2
(45) Date of Patent: Feb. 25, 2020

(54) NETWORK RESOURCE MANAGEMENT FOR HYPER-CONVERGED INFRASTRUCTURES

(71) Applicant: VMWARE, INC., Palo Alto, CA (US)

(72) Inventors: Samdeep Nayak, Bangalore (IN); Karthick Selvaraj, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 116 days.

(21) Appl. No.: 15/791,443

(22) Filed: Oct. 24, 2017

(65) Prior Publication Data

US 2019/0014049 A1 Jan. 10, 2019

(30) Foreign Application Priority Data

Jul. 4, 2017 (IN) .............................. 201741023475

(51) Int. Cl.
| | |
|---|---|
| *H04L 12/851* | (2013.01) |
| *H04L 12/26* | (2006.01) |
| *H04L 12/24* | (2006.01) |
| *H04L 12/803* | (2013.01) |
| *H04L 12/863* | (2013.01) |

(52) U.S. Cl.
CPC .............. *H04L 47/24* (2013.01); *H04L 41/22* (2013.01); *H04L 43/0882* (2013.01); *H04L 47/125* (2013.01); *H04L 47/50* (2013.01)

(58) Field of Classification Search
None
See application file for complete search history.

(56) References Cited

U.S. PATENT DOCUMENTS

| | | | |
|---|---|---|---|
| 2015/0113144 A1* | 4/2015 | Bauer | H04L 47/70 709/226 |
| 2015/0289035 A1* | 10/2015 | Mehrvar | H04L 49/356 398/51 |
| 2017/0346760 A1* | 11/2017 | Kelly | H04L 67/1097 |
| 2018/0157561 A1* | 6/2018 | Venkatesh | G06F 8/63 |
| 2018/0159729 A1* | 6/2018 | Deshmukh | H04L 61/1511 |
| 2018/0357107 A1* | 12/2018 | Devireddy | G06F 9/5077 |
| 2018/0357109 A1* | 12/2018 | Mithal | G06F 9/5077 |
| 2019/0007382 A1* | 1/2019 | Nirwal | H04L 63/061 |
| 2019/0028407 A1* | 1/2019 | Perumal Vijayan | H04L 47/822 |
| 2019/0068439 A1* | 2/2019 | Inbaraj | H04L 41/0806 |
| 2019/0068521 A1* | 2/2019 | Kumar | H04L 69/02 |
| 2019/0166032 A1* | 5/2019 | Inbaraj | H04L 43/16 |
| 2019/0174251 A1* | 6/2019 | Dowlatkhah | H04W 4/70 |

* cited by examiner

*Primary Examiner* — Otis L Thompson, Jr.
(74) *Attorney, Agent, or Firm* — Thomas | Horstemeyer, LLP

(57) ABSTRACT

Disclosed are various examples for network management in hyper-converged infrastructures. In one example, network traffic is monitored. Available bandwidth of a switch is determined using the network traffic. A host that is connected to a port of the switch is assigned to a workload domain based on the available bandwidth of the switch and expected bandwidth for the workload domain.

20 Claims, 8 Drawing Sheets

NETWORK RESOURCE MANAGEMENT FOR HYPER-CONVERGED INFRASTRUCTURES

RELATED APPLICATION

Benefit is claimed under 35 U.S.C. 119(a)-(d) to Foreign Application Serial No. 201741023475 filed in India entitled "NETWORK RESOURCE MANAGEMENT FOR HYPER-CONVERGED INFRASTRUCTURES", filed on Jul. 4, 2017 by VMware, Inc., which is herein incorporated in its entirety by reference for all purposes.

BACKGROUND

A hyper-converged infrastructure can provide an enterprise with modular and expandable compute, memory, storage, and network resources as well as system backup and recovery. In a hyper-converged infrastructure, compute, memory, storage, and network resources are brought together using preconfigured and integrated hardware. Tasks can be allocated to hardware that is capable of performing the allotted task. When a task requires more resources, additional hardware can be assigned to the task, for example, using virtualization software.

However, since the resources are pre-configured and integrated, current systems may not ensure network bandwidth will be provided for a particular task. Even when certain components within the infrastructure have sufficient network capability, the task may be assigned to a portion of the infrastructure that is currently or frequently overburdened. For example, switches in the hyper-converged infrastructure can become overburdened and incapable of handling the bandwidth requirements of all hardware connected amongst the ports of the switch. When the networks become loaded, the switches have no other option but to drop data packets. This will impact all the tasks performed in the hardware that is attached to the switch and the performance can be degraded. These problems can frustrate end users and administrators alike, which can impede productivity.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
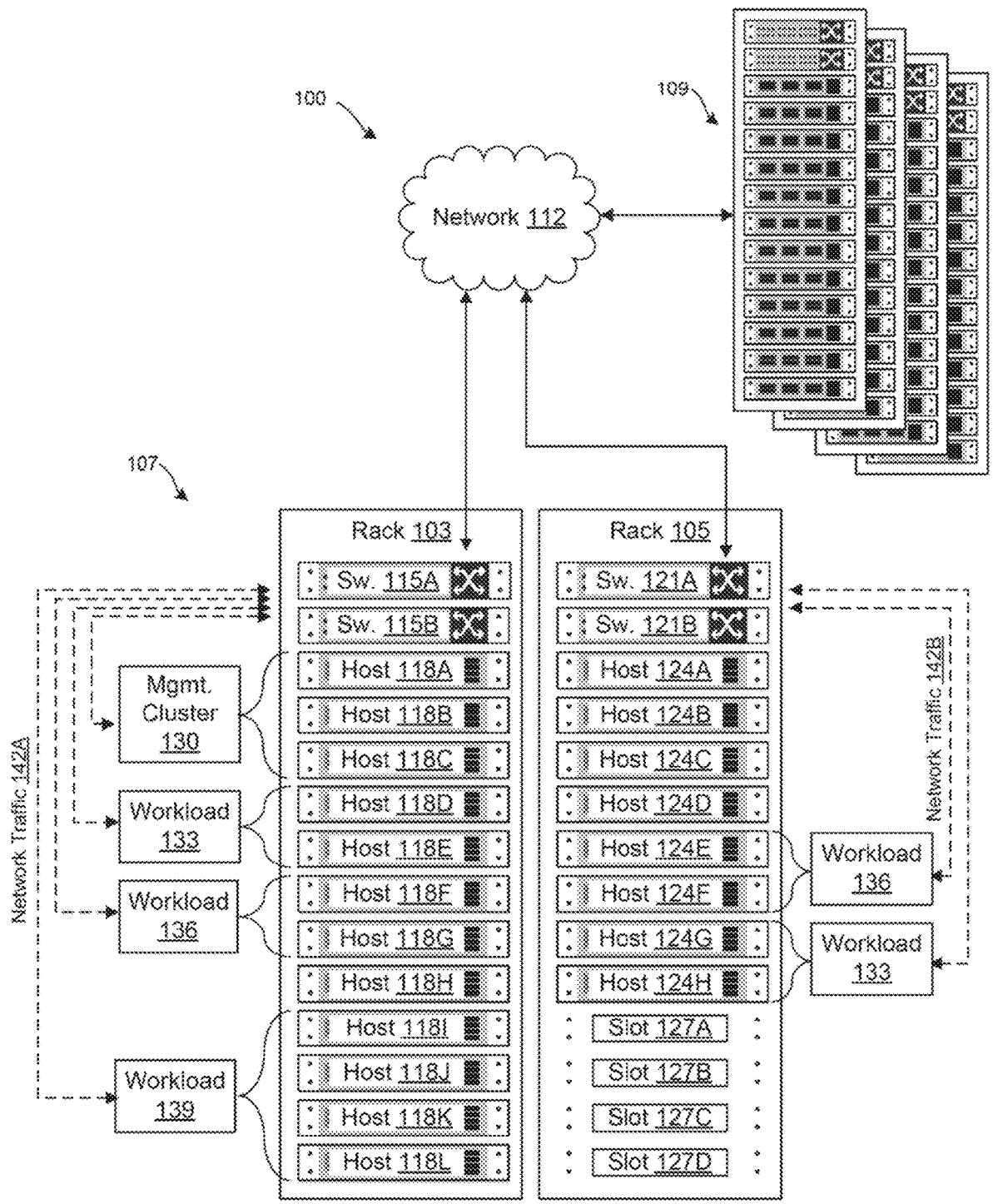
FIG. 1 is a drawing of an example of a networked environment including components connected through a network.

The present disclosure relates to network resource management for hyper-converged infrastructures and other infrastructures for providing compute, memory, storage, and network resources that are brought together using integrated hardware. When a task requires more resources, additional hardware within the infrastructure can be assigned to the task, for example, using virtualization software. Since the resources are pre-configured and integrated, current systems may not ensure network bandwidth will be provided for a particular task. For example, each rack within a hyper-converged infrastructure can have a number of switches. While expanding hardware network capabilities could alleviate some network problems, expansion can be expensive, and in some infrastructures can be difficult or impossible. As a result, switches can become overburdened and incapable of handling the bandwidth requirements of all hardware connected to the ports of the switch. These problems can frustrate end users and administrators alike, which can impede productivity. However, the examples described in the present disclosure include mechanisms capable of alleviating or eliminating these problems through network resource management.

According to some examples, program instructions can be executed in at least one computing device, which can include at least one of a plurality of hosts within a hyper-converged infrastructure. Switches, like top-of-rack (TOR) switches, other rack-integrated switches, middle-of-row switches, and end-of-row switches can also be included, as well as computing devices that are external to, or otherwise not within the hyper-converged infrastructure. Network traffic associated with the at least one switch can be monitored. Available bandwidth of a particular switch can be determined. This determination can consider factors including the network traffic and a hardware specification or capability of the particular switch, and other factors. A particular host of the plurality of hosts within the hyper-converged infrastructure can be assigned to a workload domain. The assignment can consider the available bandwidth of the particular switch and an expected bandwidth of the workload domain, among other factors. In some cases, the particular host can be one that is connected to a port of the particular switch.

In some examples, a workload domain comprising at least one of the plurality of hosts can be determined to be a low-priority workload domain, and the workload domain can be throttled. The determination can consider data that defines a type of the workload domain, including a user-selected setting obtained when the workload domain was created. Processes executed on the workload domain can also be considered.

In some situations, throttling can be enacted using a request to throttle the low-priority workload domain can be transmitted to at least one host assigned to the low-priority workload domain, the request to throttle the low-priority workload domain comprising data that specifies a bandwidth limit. In some cases, a management cluster within the hyper-converged infrastructure can transmit the request. In further examples, the low-priority workload domain can be throttled by specifying or reducing a queue length within at least one host assigned to the low-priority workload domain. The management cluster can transmit another request to the at least one host assigned to the low-priority workload domain that specifies the queue length.

In some examples, one or more of the switches, like one of the switches, can be utilized to receive tagged data including a header that identifies that the tagged data is for replication. The one or more switches can generate replicated versions of the tagged data. The replicated versions can have modified header data. In some cases, the modification can be defined or determined using a flow table. The one or more switches can also transmit the replicated versions of the tagged data to a number of destination hosts, for example, for disaster recovery. In further examples, a flow table can be defined within the at least one switch. In some cases, the flow table is defined using a request that is transmitted to the at least one switch from the management cluster to the at least one switch.

With reference to FIG. 1, shown is an example of a networked environment 100. The networked environment 100 can have components including racks 103 and 105 of a site 107, and additional racks of a site 109, in communication with one another over a network 112. The network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, cellular networks, telephony networks, and other types of networks. The network 112 can also include switches, routers, and other network devices. The network devices can include network devices that are held or integrated within racks and network devices that are external to the racks.

In some cases, the rack 103 can be a rack that is part of a hyper-converged infrastructure having compute, memory, storage, and network resources that are provided using integrated and/or preconfigured hardware. In other cases, a rack can be part of a converged infrastructure or another type of infrastructure. The rack 103 can have a preconfigured number of switches, or a preconfigured number of slots for switches or other network devices. For example, the rack 103 can have switches 115A and 115B. The switches 115A and 115B can be top-of-rack switches or other integrated network devices of the rack 103. While not shown, the switches 115 can also be further connected to other switches and network devices of the site 109, including spine switches, End-of-Row switches, Middle-of-Row switches, or other switches, routers, and the like. The rack 103 can also include a number of hosts, or a preconfigured number of slots or bays for hosts. For example, the rack 103 can have hosts 118A-118L (collectively, "hosts 118"). Where the rack 103 is part of a hyper-converged infrastructure, each of the hosts 118 can provide compute, memory, storage, and network resources. Where the rack 103 is part of a hyper-converged infrastructure, each of the hosts 118 can provide compute, memory, storage, and network hardware. Each of the hosts 118 can be connected to the network 112 through the switches 115A and 115B. For example, the host 118 can include two NICs connected to the switches 115A and 115B. Individual ones of the hosts 118 can be connected to both a port of the switch 115A and a port of the switch 115B. While the hosts 118 are connected to the network 112 through the switches 115A and 115B, the switches 115A and 115B can be considered a part of the network 112, as can network cards or controllers of the individual hosts.

Similarly, the rack 105 can also include a number of hosts, or a preconfigured number of slots or bays for hosts. For example, the rack 105 can have hosts 124A-124L (hosts 124) as well as slots 127A-127D (slots 127). The slots 127 can accommodate or accept additional hosts to expand the compute, memory, storage, network, and other resources provided by the rack 105. Where the rack 105 is part of a hyper-converged infrastructure, each of the hosts 124 can provide compute, memory, storage, and network resources. Where the rack 105 is part of a hyper-converged infrastructure, each of the hosts 124 can provide compute, memory, storage, and network hardware. Each of the hosts 124 can be connected to the network 112 through the switches 121A and 121B. For example, individual ones of the hosts 124 can be connected to both a port of the switch 121A, and a port of the switch 121B. The switches 121A and 121B can be considered a part of the network 112, as can network cards or controllers of the individual hosts.

For example, each of the hosts 118 and 124 can be a processor-based system, such as a computer system, and can include at least one computing device, at least one storage device, and at least one network device. While referred to in the singular for clarity, multiple computing devices, storage devices, and network devices can be included in each host. The computing device can include a processor circuit, such as one that includes a processor and a memory. The storage devices can include memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. The network devices can include network interface controllers or network interface cards (NICs), switches, routers, and other network devices. The hosts can be utilized to perform or execute instructions, including processes, programs, applications, and other tasks that can be utilized in concert, for example, using software like the SDDC manager 203, VMware vSphere®, vSAN®, NSX®, ESX®, ESXi®, and other virtualization software or tools.

The rack 103 and the rack 105 can be part of the site 107, which can be considered a local site. Additional racks can be provided at the site 109, which can be considered a remote site. In some cases, one or more of the sites can be provided by a service that provides compute, memory, storage, network, and other resources to an enterprise or another customer of the service. In other cases, one or more of the site can also be owned or operated by the enterprise. The workload domains at the remote site 109 can be mirrors or backups of the management cluster 130 and the workload domains 133, 136, and 139 for disaster recovery. In some cases, backups at the remote site 109 can be in a similar configuration as the active workload domains at the site 107. For example, the workload domains can utilize a similar number of switches, and can be provided similar network configuration so the backup or mirror can perform the same as the active workload domains at the site 107. In other examples, backup workload domains can be in a different configuration, and may provide a mirror or backup of all tasks programs, data, and the like within an operational infrastructure, but may not be an exact infrastructural match with respect to the compute and network resources. In other cases, the remote site 109 can instead include other workload domains, or can provide additional hosts for the management cluster 130 and the workload domains 133, 136, and 139, rather than being a backup or mirror of the site 107.

Software instructions can provide and assign resources using containers called workload domains. A workload domain can be a physical collection of compute, memory, storage, and network resources that provide uniform characteristics to applications and tasks such as security, data protection, performance, availability, and modular expandability. A workload domain can perform or execute tasks, including applications, programs, and other instructions. Workload domains can provide infrastructure as a service (IaaS), platform as a service (PaaS), desktop as a service (DaaS)/virtual desktop infrastructure (VDI). These can be considered workload domain types, and workload domain types can further include test and development workload domain types, production workload domain types, and other domain types that can include any of these services or a combination of these and other services. Each domain type can be associated with a particular set of policies, settings, and capabilities for the workload domain. While an established workload domain can be assigned any desired task, workload domains can have a particular purpose or usage characteristics. In other words, there can be various types of workload domains. During the creation of workloads, the application or task requirements of the workload can be translated, for example, by the SDDC manager 203, to physical infrastructure requirements including a number of hosts to assign to the workload, each having compute, memory, storage, and network devices. The applications, tasks or other functionalities can be performed or brought up on the chosen hardware.

For example, types of workload domains can include production workload domains, test and development workload domains, management workload domain or management cluster, disaster recovery workload domains, and others. Each type of workload domain can be assigned a particular priority, such that one type of workload domain is a lower priority than another workload. Each type of workload domain can also be assigned a particular expected bandwidth. Workload domain priority can be assigned, for example, as high-priority, low-priority, a numerical or other value-based priority. The priority of workload domains can be compared to other workload domains, and the lowest-priority workload domains can be throttled if throttling becomes necessary in order to maintain network resource availability for higher-priority workload domains. Moreover, individual workload domains of any type can be set to a particular priority to meet the needs of an enterprise.

A production workload domain can, for example, be used for providing virtual desktop infrastructure (VDI). Users can access typical desktop environments, operating systems, applications, and the like. Production workload domains can be high-priority and can require dedicated bandwidth, or fewer network interruptions, to provide the best customer experience. It should be noted that while production workload domains can be high-priority workload domains, priority of a workload domain can be set to any level of priority. Some production workload domains can be higher than other production workload domains, or a customer may desire to set a certain production workload domain as a low-priority workload as compared to other types of workloads. Production workload domains can be assigned to hosts that are relatively nearby to target users, for example, on-site with target users, or at a remote site having a high-quality network connection for target users.

A test and development workload domain can, for example, be used for providing Infrastructure as a Service (IaaS), Software as a Service (SaaS), and other services and tasks for test and development. For example, test and development workload domains can provide an environment with infrastructure components, storage solutions, and applications for test and development, as well as handle tasks including system maintenance and software execution. While test and development workload domains can be assigned any desired priority, these domains can generally be regarded as a lower priority than production workload domains.

A disaster recovery workload domain can provide IaaS, SaaS, and other services and tasks for disaster recovery. For example, disaster recovery workload domains can provide an environment with infrastructure components, storage solutions, and applications for disaster recovery, temporary or permanent replacement of other workload domains, recovery of other workload domains, system maintenance, and the like. While disaster recovery workload domains can be assigned any desired priority, these domains can generally be regarded as a lower priority than production workload domains. However, since disaster recovery workload domains can be used for temporary or permanent replacement for production workload domains, once reassigned, they may assume or be reassigned to the priority of the workload domain that they are replacing.

A management workload domain can be used for providing software defined data center (SDDC) functionality. The SDDC functionality can be provided through policy-based data center management software. The SDDC functionality can allow administrators to centrally monitor and administer all workload domains, applications, and tasks across individual sites or multiple sites, including local hardware, private cloud, public cloud, and hybrid cloud deployments. Administrators can deploy and manage workload domains in physical, virtual, and cloud environments with a unified management experience through a management workload domain executing SDDC functionality. Management workload domains can also be referred to as a management cluster. While a management workload domain can be assigned any desired priority, it can generally be regarded as a high-priority workload domain.

These types of workload domains are illustrative, and any type or naming convention can be used for types of workload domains. For example, new workload domains can be assigned to a particular preconfigured workload domain type, or a user-created custom workload domain type. Also, existing workload domains can execute particular applications, and can be assigned to a type after they are initially established by analysis of the applications and tasks performed by the particular workload domain, for example, if they match a profile of a particular preconfigured workload domain type or a user-created custom workload domain type. While certain functionalities are discussed regarding particular types of workload domains, any of the functionalities and applications can also be provided by these and other workload domains. For example, internet of things (IoT) functionalities, AirWatch® functionalities, VMware® Photon OS, and other functionalities and application types can be provided. During the creation of workload domains, the applications and tasks to be performed can be translated to physical infrastructure requirements including compute, memory, storage, and network requirements. In some cases, the applications and tasks performed and the compute, memory, storage, and network requirements can be used to determine a particular host to assign to the workload domain at creation.

A single physical rack can support multiple workload domains. Also, a single workload domain can be assigned hosts from multiple different physical racks, and hosts from multiple sites or locations. For example, any of the hosts 118, hosts 124, or hosts of the remote site 109 can be assigned to a workload domain. A single workload domain can be assigned to multiple hosts 118 of the rack 103. Alternatively, a single workload domain can be assigned a host from the rack 103, a host from the rack 105, and a host from the remote site 109. It should be noted that in some cases, the site 107 can be a private cloud site, and the remote site 109 can be a public cloud site, such that the networked environment 100 can be considered a hybrid cloud environment. In other cases, each of the sites 107 and 109 can be private, or each of the sites 107 and 109 can be public.

Referring back to FIG. 1, the hosts 118A, 118B, and 118C can be assigned to a management workload domain or management cluster 130. The management cluster 130 can provide the physical resources to execute a workload that includes a SDDC and other functionality that can allow administrators to centrally monitor and administer all workload domains, applications, and tasks across individual sites or multiple sites, including local hardware, private cloud, public cloud, and hybrid cloud deployments. The physical hosts 118A-118C can be connected to the network 112 through the switches 115A and 115B. Accordingly, each of the hosts 118A-118C can be connected to a port of the switch 115A and to a port of the switch 115B. The functionalities provided through the management cluster 130 can monitor and analyze network traffic 142 including network traffic 142A to and from the hosts 118 through the switches 115, as well as the network traffic 142B to and from the hosts 124 through the switches 121. The management cluster 130 can assign particular hosts to workload domains upon creation and can add additional hosts to a particular workload domain when needed. In addition, the management cluster 130 can reassign or shift workload domains to use different hosts, for example, by assigning a new host to the workload domain, and then removing a previous host from the workload domain. The management cluster 130 can throttle particular workload domains or types of workload domains that are determined to be low-priority workload domains. The management cluster 130 can also cause any of the switches 115, 121, or other switches to follow a particular flow definition.

The hosts 118D and 118E of the rack 103 can be assigned to a workload domain 133. The workload domain 133 can provide the physical resources to execute functionality or a workload including applications and tasks. The physical hosts 118D and 118E can be connected to the network 112 through the switches 115A and 115B. Accordingly, each of the hosts 118D-118E can be connected to a port of the switch 115A and to a port of the switch 115B. The hosts 124G and 124H of the rack 105 can also be assigned to the workload domain 133. The physical 124G and 124H can be connected to the network 112 through the switches 121A and 121B. Each of the hosts 124G and 124H can be connected to a port of the switch 121A and to a port of the switch 121B. Accordingly, hosts from different racks can be assigned to a single workload domain 133. In some cases, high-bandwidth workload domains and/or high-priority workload domains can be assigned hosts from different racks and from different sites.

The assignment of the hosts 118D, 118E, 124G and 124H to the workload domain 133 can also be based on available network resources of switches 115 and 121 through which the hosts are connected to the network 112. The assignment of these hosts can also be further based on an expected bandwidth requirement or actual bandwidth requirement of the workload domain 133. For example, an expected bandwidth can be selected by a user upon workload domain creation, or can be determined based on a selected type of the workload domain 133. An expected bandwidth can also be determined using the tasks or functionalities that are selected to be performed by the workload domain 133. An actual bandwidth requirement can be a measured bandwidth used by the workload domain 133, for example an average, mean, or mode bandwidth usage for the workload domain 133 over an amount of time.

Likewise, the hosts 118F and 118G of the rack 103 can be assigned to a workload domain 136 that provides the physical resources to execute functionality or a workload including applications and tasks. The physical hosts 118F and 118G can be connected to the network 112 through the switches 115A and 115B. The hosts 124E and 124F of the rack 105 can also be assigned to the workload domain 136. The physical 124E and 124F can be connected to the network 112 through the switches 121A and 121B. The assignment of these hosts to the workload domain 136 can also be based on available network resources of switches 115 and 121 through which the hosts are connected to the network 112 as well as an expected bandwidth requirement or actual bandwidth requirement of the workload domain 136.

The hosts 118I-118L of the rack 103 can be assigned to a workload domain 139 that provides the physical resources to execute functionality or a workload including applications and tasks. The physical hosts 118I-118L can be connected to the network 112 through the switches 115A and 115B of the rack 103. Further, the host 118H of the rack 103, and the hosts 124A-124D of the rack 105 can be unassigned and can later be assigned to a workload domain using the available network resources of switches 115 and 121 through which the hosts are connected to the network 112 as well as an expected bandwidth requirement or actual bandwidth requirement.

Figure 2:
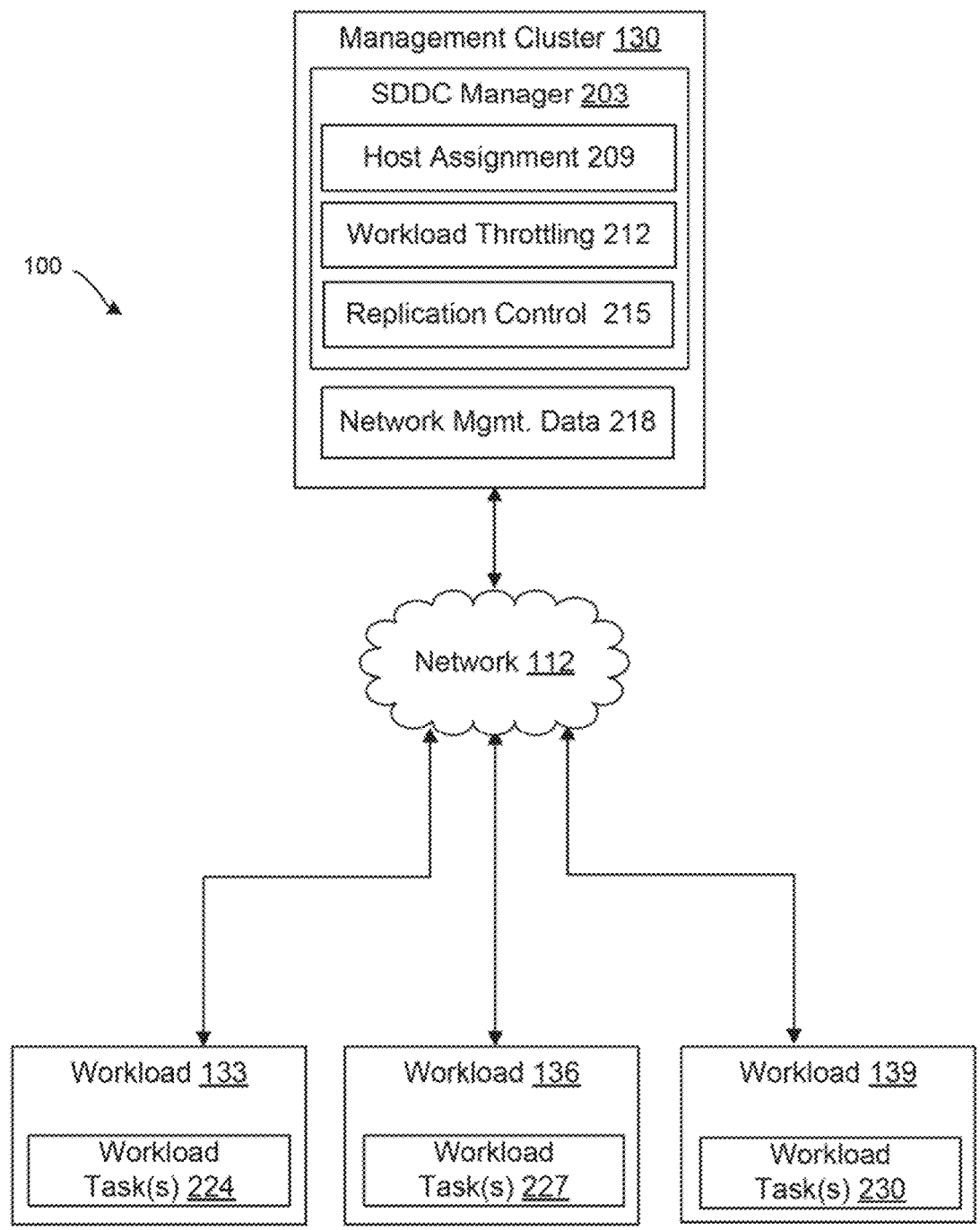
FIG. 2 is a drawing further illustrating components of the networked environment including a management cluster and workload domain components connected through the network.

Referring to FIG. 2, shown is an example of components of the networked environment 100 in communication through the network 112. The management cluster 130 can execute an SDDC manager 203. VMware vSphere®, vSAN®, NSX®, ESX®, ESXi®, and other virtualization software and tools can also be executed in the management cluster 130 and the various hosts, and can work in concert with, and can be considered part of, the SDDC manager 203. The SDDC manager 203 can allow administrators to centrally monitor and administer all workload domains, applications, and tasks across individual sites or multiple sites, including local hardware, private cloud, public cloud, and hybrid cloud deployments. Administrators can deploy and manage workload domains in physical, virtual, and cloud environments with a unified management experience through at least one user interface generated by management cluster 130 executing the SDDC manager 203. For example, administrators can create new workload domains through the user interface of the SDDC manager 203. Additionally, hosts can be manually assigned and shifted within the available hosts through the user interface of the SDDC manager 203. Administrators can configure and change properties, settings, and other configurations for particular workload domains. For example, a particular workload domain can be configured to have a certain priority, such as a low-priority workload domain setting or a high-priority workload domain setting. A particular workload domain can be further manually set to have a particular expected bandwidth requirement.

The SDDC manager 203 can monitor and analyze network traffic 142 including network traffic 142A to and from the hosts 118 through the switches 115, as well as the network traffic 142B to and from the hosts 124 through the switches 121. Additional network traffic 142 through spine switches and other network devices at the sites 107 and 109 to and from any of the hosts can also be monitored and analyzed. The SDDC manager 203 can monitor and analyze key switch data like available transmit buffer and receive buffer in each switch port, switch store and forward buffers available, congestion control and pause frames received by other connected network switches, routers, or other network devices. This will help to understand switch congestion conditions. Whenever all the switch ports are pumping in data causing overall congestion due to limited switch processing capability or bandwidth.

The SDDC manager 203 can determine a type of new or existing workload domains using applications, tasks, and other functionalities to be performed. Also, the SDDC manager 203 can determine that a particular workload domain is a low-priority workload domain, high-priority workload domain, or otherwise set the priority of the particular workload domain. This determination can be based on a type of the workload domain or programs, applications, tasks, and other functionalities to be performed. The SDDC manager 203 can determine a bandwidth requirement like an expected bandwidth requirement for a particular workload domain based on a type of the workload domain or programs, applications, tasks, and other functionalities to be performed. The SDDC manager 203 can also analyze the network traffic 142 to determine an actual bandwidth requirement of a particular workload domain. The SDDC manager 203 can also analyze the network traffic 142 to determine that a particular switch is congested, for example, below a predetermined threshold of available bandwidth or actual bandwidth based on the network traffic 142 and a bandwidth of the particular switch. The SDDC manager 203 can also determine that a particular switch is overloaded using a hardware specification or capability of the particular switch and the expected bandwidth of workload domains being executed on hosts that are connected to the network 112 through the particular switch.

The SDDC manager 203 can include subroutines, modules, or applications including a host assignment application 209, a workload throttling application 212, and a replication control application 215. The host assignment application 209, the workload throttling application 212, and the replication control application 215 can alternatively be independently executed applications or tasks that can run on any of the hosts, for example, hosts assigned to the management cluster 130. The management cluster 130 can store the SDDC manager 203, the host assignment application 209, the workload throttling application 212, the replication control application 215, and additional applications or programs in a data store of the management cluster 130. The management cluster 130 can also store network management data 218 in the data store of the management cluster 130. The data store can be representative of multiple disks, drives, and other memories that are included in any of the hosts 118A-118C that are assigned to the management cluster 130.

The network management data 218 can include network traffic data based on network traffic 142, switch data for each of the switches 115 and 121, host data for each of the hosts 118 and 124, and other data. The switch data can include bandwidth ratings and other hardware specifications and capabilities for the switches 115 and 121, as well as measured usage statistics including available transmit buffer and receive buffer in each switch port, switch store and forward buffers used, and pause frames received. The host data can include bandwidth ratings and other hardware specifications of NICs and other network devices of each of the hosts 118 and 124, expected bandwidth for each of the hosts 118 and 124, and actual bandwidth usage including current and average bandwidth usage for each of the hosts 118 and 124. The host data can include the settings and configurations of each of the workload domains executed on the hosts 118 and 124, as well as settings and configurations of new workload domains that are being created.

The workload domain 133 can include workload tasks 224. The workload tasks 224 can include programs, applications, instructions, and other functionalities that are executed by the workload domain 133. For example, VDI functionalities, IaaS functionalities, SaaS functionalities, IoT functionalities, VMware® Photon OS, AirWatch®, and other functionalities and application types can be provided by executing the workload tasks 224 using the workload domain 133. The workload tasks 224 and other files and data can be stored and distributed on any of the data stores or other memories of the various hosts 118D, 118E, 124G, and 124H assigned to the workload domain 133. Likewise, the workload domains 136 can include workload tasks 227 and other data stored and distributed on any of the data stores or other memories of the various hosts assigned to the workload domain 136. The workload domain 139 can include workload tasks 230 and other data that is stored and distributed on any of the data stores or other memories of the various hosts assigned to the workload domain 139.

The host assignment application 209 can analyze the network management data 218 and network traffic 142 to assign hosts to a workload domain. This can include assigning new workload domains to appropriate hosts that match a bandwidth requirement, for example, because the switch that the host is connected through has matching available bandwidth or will otherwise maximize efficacy of the components of the networked environment 100. Analysis and assignment of hosts can also include shifting existing workload domains to different hosts in order to maximize efficacy of the components of the networked environment 100. For example, the workload domain 133 can be a high-priority workload domain providing VDI and other production functionalities. The workload domain 133 and other high-priority workload domains can be configured with a dedicated bandwidth, such as a minimum bandwidth that is allocated and ensured to be provided to the workload domain 133. The workload domain 136 can also be a medium-priority workload domain providing VDI and other production functionalities. The workload domain 136 can have a particular expected bandwidth, but may not have dedicated bandwidth. The workload domain 139 can be a low-priority domain providing IaaS and other test and development functionalities.

In this situation, the host assignment application 209 can analyze the network management data 218 and network traffic 142 and distribute the production workload domain 133 to the hosts 118D and 118E, as well as to the hosts 124G and 124H. Accordingly, the host assignment application 209 can assign the workload across multiple racks 103 and 105 to make use of bandwidth and network resources of both the switches 115A and 115B, as well as the switches 121A and 121B. Distributing the workload domain 133 across multiple racks can provide a greater number of switches, more bandwidth, and avoid congestion, and ensure the dedicated minimum bandwidth allocated to the workload domain 133. For example, if the switches 115A and 115B are congested, the workload domain 133 can still utilize the switches 121A and 121B. The assignment of hosts to the workload domain 133 can also be made using any of the network management data 218.

Further, the host assignment application 209 can also analyze the network management data 218 and network traffic 142 and distribute the production workload domain 136 to the hosts 118F and 118G, as well as the hosts 124E and 124F. Distributing the workload domain 136 across multiple racks can provide more switches and avoid congestion as discussed for the workload domain 133.

The host assignment application 209 can also analyze the network management data 218 and network traffic 142 and distribute the test and development workload domain 139 to the hosts 118I-118L. Since the workload domain 139 is a test and development workload domain, the switches 115A and 115B can provide sufficient bandwidth, and avoiding congestion can be less important for the low-priority and/or low bandwidth requirements of the test and development workload domain 139.

The workload throttling application 212 can analyze the network management data 218 and network traffic 142 to determine that a particular workload domain executed on the hosts 118 and 124 should be throttled. The workload throttling application 212 can determine that the switches 115A and 115B are overburdened, for example, because the switches 115A and 115B will have to drop packets of data being communicated through the switches 115 to and from the hosts 118 of the rack 103 or because the available bandwidth of one or more of the switches 115 is at or below a predefined threshold bandwidth. The workload throttling application 212 can also determine that the workload domain 139 is a low-priority workload or that the workload domain 139 is a lowest-priority workload domain out of the workload domains connected to the switches 115A and 115B of the rack 103, and the workload throttling application 212 can throttle the workload domain 139. For example, the workload throttling application 212 can transmit a request to throttle the workload domain 139 from the SDDC manager 203 to at least one of the switches 115 or the workload domain 139. The request to throttle the workload domain 139 can include a bandwidth limit, and can invoke an API like a Network I/O Control (NIOC) API, for example, in vSphere®.

Additionally or alternatively, the workload throttling application 212 can transmit another request to throttle the workload domain 139 from the SDDC manager 203 to the workload domain 139. This request can specify a device queue length, for example, a reduced device queue length. This approach can be used to throttle I/O from test and development workload domains and other low-priority workload domains.

The replication control application 215 can determine a replication flow definition and transmit a request to define a replication flow table within at least one of the switches 115 and 121. The replication flow definition defines what actions the at least one of the switches 115 should take for data that is to be replicated. For example, the replication flow table can be defined within the switch 115A so the switch 115A can identify tagged data for replication or disaster recovery. Once identified, the switch 115A can determine or identify destination hosts for tagged data, generate replicated versions of the tagged data, and transmit the replicated versions of the tagged data to the destination hosts. Accordingly, the hosts can send tagged data once, and allow a switch to replicate and transmit it, rather than having the host send the data to the switch for each of the destination hosts. This means the switch receives the tagged data fewer times, reducing traffic through the switch.

Figure 3:
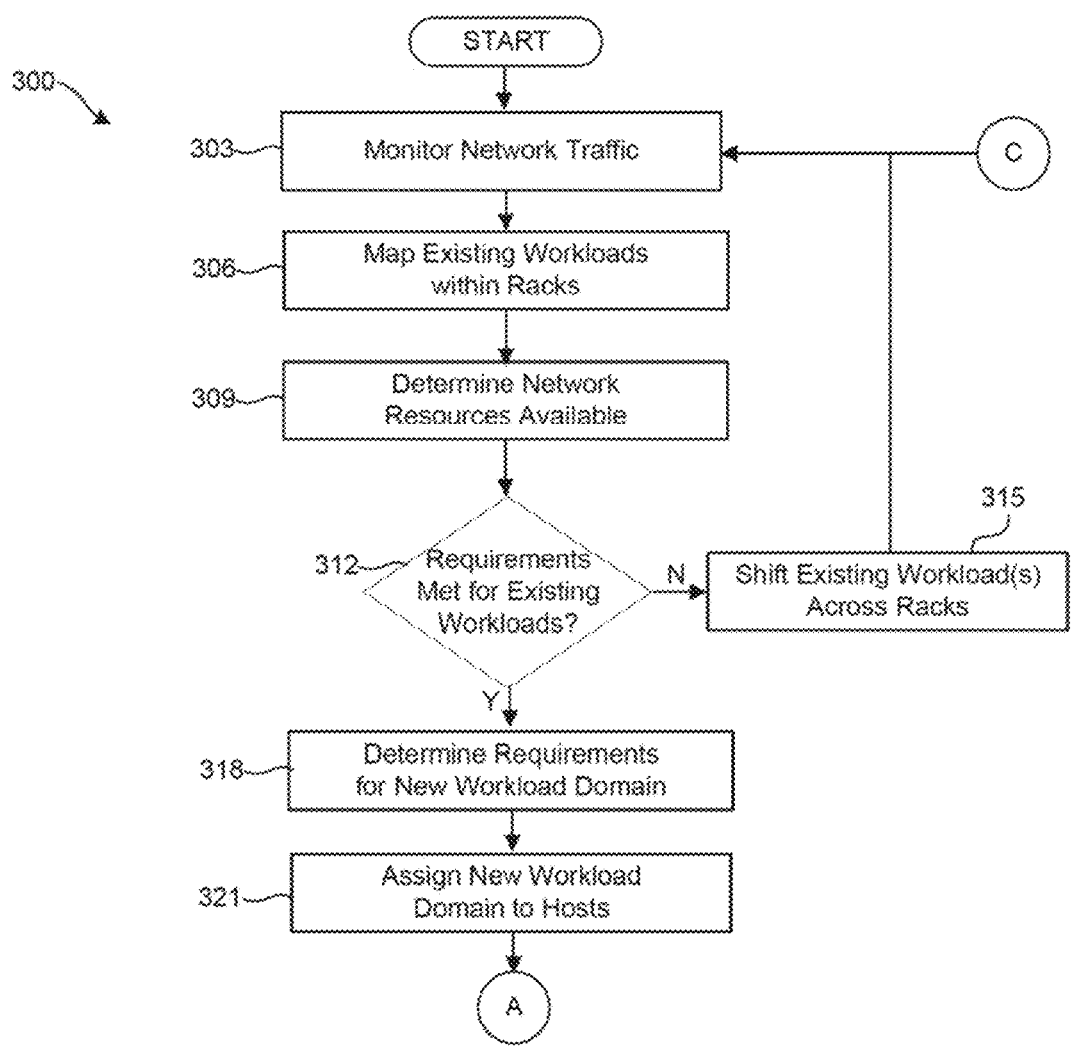
FIGS. 3-6 are example flowcharts illustrating functionalities implemented by components of the networked environment.

Referring to FIG. 3, shown is an example flowchart 300 describing steps that can be performed by the components of the networked environment 100 of FIG. 1. Generally, the flowchart 300 describes how the management cluster 130 executing the SDDC manager 203 provides network resource management. In some cases, some of the steps performed in FIG. 3 can be considered part of the host assignment application 209 of the SDDC manager 203.

In step 303, the SDDC manager 203 can monitor network traffic 142 including network traffic 142A to and from the hosts 118 through the switches 115, as well as the network traffic 142B to and from the hosts 124 through the switches 121. Additional network traffic 142 through spine switches and other network devices at the sites 107 and 109 to and from any of the hosts can also be monitored and analyzed. To accomplish this, the SDDC manager 203 can, for example, monitor and analyze key switch data, such as available transmit buffer and receive buffer in each switch port, switch store and forward buffers available, congestion control and pause frames received by other connected network switches, routers, or other network devices. This can help to understand congestion conditions within the network devices including limited switch processing capability or bandwidth.

The SDDC manager 203 can monitor the ongoing network traffic 142 and the bandwidth usage and availability. This monitoring can be used to map the existing workload domains like the management cluster 130 and the workload domains 133, 136, and 139 running in the particular rack with their network/bandwidth usage patterns. For example, if the production workload domain 133 in rack 103 has to be expanded, new hosts can be added and/or network bandwidth can be provided by shifting hosts across multiple racks in order to provide the required bandwidth.

In step 306, the SDDC manager 203 can map existing workload domains within racks 103 and 105 at the site 107, as well as additional workload domains within racks at the remote site 109. The SDDC manager 203 can keep track of physical switches capabilities, including the switches 115 and the switches 121, as well as the mapping of the management cluster 130 and the workload domains 133, 136, and 139 with their respective physical hosts and their network connections including port connections with the switches.

In step 309, the SDDC manager 203 can determine network resources that are available. The SDDC manager 203 can calculate and discover available bandwidth for the switches for any given rack including the racks 103 and 105. This information can be utilized for choosing physical hosts for workload domain placement, balancing existing workload domains, or determining whether requirements for new and existing workload domains can be met.

The SDDC manager 203 can determine available network resources at any level of granularity. For example, available network resources or bandwidth can be determined for the rack 103 by considering the switches 115 (e.g., TOR switches) through which the hosts 118 of the rack 103 are connected to the network 112. Available network resources for a group of racks including the rack 103 and 105 can also be determined, for example, by considering the spine switches or other switches through which the group of racks 103 and 105 are connected to the network 112. Workload domains can be assigned hosts within a rack, group of racks, site, or group of sites that has available network resources or bandwidth in the network devices through which they are connected to a network.

In one example, the determination of available network resources can be for the rack 103. The rack 103 includes switches 115A and 115B, through which each of the hosts 118 within the rack 103 are connected to the network 112. The SDDC manager 203 can compare a hardware specification and other switch data of the switches 115 to a total bandwidth requirement of existing workload domains connected to the switches 115, including the management cluster 130 and the workload domains 133-139. The total bandwidth requirement can be a sum of expected bandwidth settings for each of the management cluster 130 and the workload domains 133-139. Expected bandwidths of the workload domains 133-139 can consider measured bandwidth usage of each workload domain through the switches 115 (and the switches 121) as well as an expected bandwidth setting obtained from an administrator. The total bandwidth can also be a measured total average bandwidth through the switches 115, while the management cluster 130 and the workload domains 133-139 are in their current configuration with respect to the switches 115. Dedicated bandwidths allocated to the various workload domains can also be considered when determining available network resources or bandwidth. Switch data for the switches 115 can also be considered, including available transmit buffer and receive buffer in each switch port of the switches, switch store and forward buffers available, and pause frames received by other connected network switches, routers, or other network devices.

Likewise, the available network resources for the rack 105 can include analysis of switches 121A and 121B, through which each of the hosts 124 within the rack 105 are connected to the network 112. The SDDC manager 203 can compare a hardware specification or capability of the switches 121 to a total bandwidth requirement of existing workload domains connected to the switches 121, including the workload domains 133 and 136.

In step 312, the SDDC manager 203 can determine whether requirements are met for existing workload domains. For example, a total bandwidth requirement of the management cluster 130 and the workload domains 133-139 can be greater than a hardware specification or capability of the switches 115. Alternatively, the SDDC manager 203 can identify or determine that the switches 115 are frequently dropping below a threshold level of available network resources when the management cluster 130 and the workload domains 133, 136, and 139 are in their current configuration. In this example, the SDDC manager 203 can prevent new workload domains from being assigned to the rack 103, as all of the hosts 118 are connected through the switches 115. If the SDDC manager 203 determines that requirements are met for existing workload domains, the SDDC manager can move to step 318. If the SDDC manager 203 determines requirements are not met for existing workload domains, the SDDC manager 203 can move to step 315.

In step 315, the SDDC manager 203 can also shift existing workload domains across racks. Following the example from step 312, the SDDC manager 203 can alleviate congestion by shifting one or more of the workload domains 130-139 to another rack or another site. For instance, the SDDC manager 203 can decide to shift the workload domain 139, or part of the workload domain 139 to the rack 105. The SDDC manager 203 can then shift the workload domain 139 by adding or assigning the hosts 124A and 124B to the workload domain 139 and removing the hosts 118I and 118J. The SDDC manager 203 can update its mapping of workload domains accordingly.

In some cases, this can be performed by the SDDC manager 203 as needed automatically. A resource management algorithm of the SDDC manager 203 shift the workload domains across racks so that the bandwidth needs are met. This can include balancing a rack with an appropriate mix of workload domains so there are no network drops or latency issues for mission critical applications. Further, a notification can be sent to an administrator, for example, through a user interface of the SDDC manager 203, and in some situations an authorization can be obtained from the administrator before shifting existing workload domains. Once the workload domains are shifted, the SDDC manager 203 can again monitor network traffic as discussed in step 303.

In step 318, the SDDC manager 203 can determine requirements for a new workload domain. In some cases, new workload domains can be added once requirements for existing workload domains are met and in satisfactory condition. Requirements for a new workload domain can be initially obtained from an administrator through a user interface of the SDDC manager 203 during creation of the new workload domain. The requirements can include compute, memory, storage, and network requirements. The requirements can be obtained from an administrator by selection of a predefined setting or options through a user interface of the SDDC manager 203 or can be manually entered by the administrator through the user interface.

In step 321, the SDDC manager 203 can assign the new workload domain to hosts. The SDDC manager 203 can intelligently choose hosts that are connected through switches or are within a rack that satisfies the bandwidth requirement, as well as the compute, memory, storage, and other requirements of a particular workload domain. For example, when assigning hosts to the new workload domain, the SDDC manager 203 can determine that either of the racks 103 or 105 can be utilized, because switches 115 and switches 121 are not overloaded, and the SDDC manager 203 can decide to assign the host 124A to the new workload domain because the switches 121A and 121B of the rack 105 have more available bandwidth than the switches 115A and 115B of the rack 103. As another example, the SDDC manager 203 can decide to assign the host 124A to the new workload domain in order to prevent the new workload domain from jeopardizing the dedicated bandwidth of the workload domain 133. In a further example, the SDDC manager 203 can decide to assign the host 124A and the host 118H to the new workload domain in order to provide additional network resources to the new workload domain using both the switches 115 and the switches 121. The SDDC manager 203 can move to steps shown in the flowchart of FIG. 4.

Figure 4:
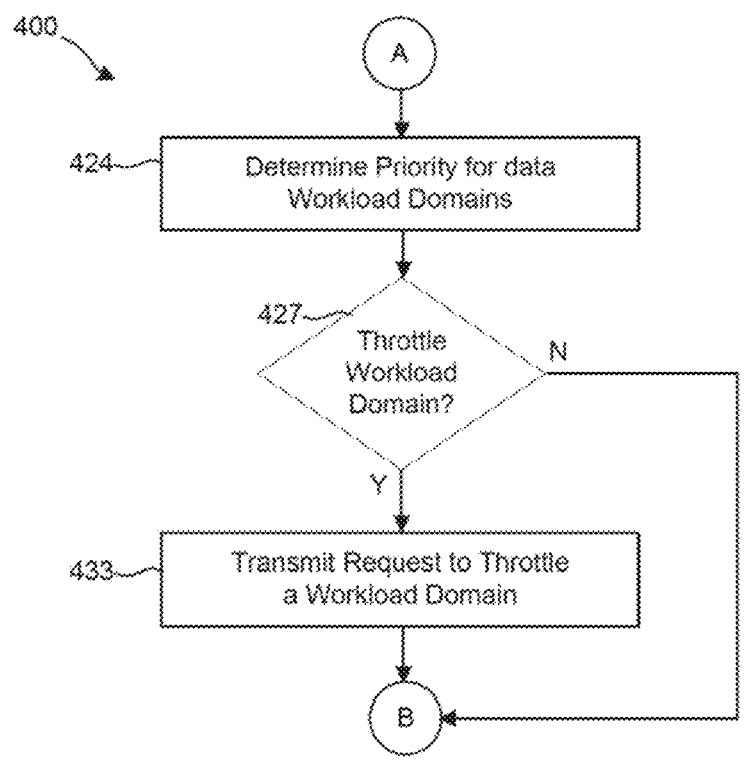

In FIG. 4, shown is an example flowchart 400 describing steps that can be performed by the components of the networked environment 100 of FIG. 1. Generally, the flowchart 400 describes how the management cluster 130 executing the SDDC manager 203 provides network resource management. In some cases, some of the steps performed in FIG. 3 can be considered to be part of the workload throttling application 212 of the SDDC manager 203.

In step 424, the SDDC manager 203 can determine priority data for workload domains. The SDDC manager 203 can determine a priority of the workload domain 139 using a type of the workload domain 139. The type of the workload domain 139 can also be set by an administrator by obtaining a selection of a user interface element through a user interface of the SDDC manager 203 at creation of the domain or thereafter. On the other hand, certain workload domains can be set to a higher priority by obtaining a selection of a user interface element through a user interface of the SDDC manager 203. In some cases, the SDDC manager 203 can generate a hierarchy with a number of levels, and the SDDC manager 203 or an administrator can determine a level for each workload domain. Workload domains that are lower within the hierarchy can be throttled before workload domains at a higher level within the priority hierarchy of workload domains. Certain types of workload domains can be associated with particular levels within the hierarchy, or certain applications or tasks associated with a particular workload domain can be associated with a particular level within the hierarchy. Some workload domains can be set so that they should not be throttled and should not be determined to be a low-priority workload domain by the SDDC manager 203, for example, by inclusion within a highest level of the hierarchy or by another setting associated with the workload domain.

In step 427, the SDDC manager 203 can determine whether to throttle a workload, for instance, the workload domain 139. For example, the SDDC manager 203 can determine that the workload domain 139 is a low-priority workload that should be throttled, or a lowest-priority workload among the management cluster 130 and the workload domains 133, 136, and 139 of the rack 103. The SDDC manager 203 can determine to throttle the workload domain 139 by obtaining a selection of a user interface element through a user interface of the SDDC manager 203. The SDDC manager 203 can also consider whether the switches 115 are currently below a threshold network availability or bandwidth or below the threshold network availability or bandwidth a certain percentage of time. If the SDDC manager 203 determines that a workload should not be throttled, the SDDC manager can move to step B. If the SDDC manager 203 determines that a workload should be throttled, the SDDC manager can move to step 433.

In step 433, the SDDC manager 203 can transmit a request to throttle a workload domain. In one example, the SDDC manager 203 can transmit a request to throttle the workload domain 139 from the SDDC manager 203 to at least one of the switches 115 or the workload domain 139. The request to throttle the workload domain 139 can include a bandwidth limit, and can invoke an API like a Network I/O Control (NIOC) API that throttles the workload domain 139. Additionally or alternatively, the SDDC manager 203 can transmit another request to throttle the workload domain 139 that specifies a device queue length, for example, a reduced device queue length. These approaches can be used to throttle I/O for low-priority workload domains.

Figure 5:
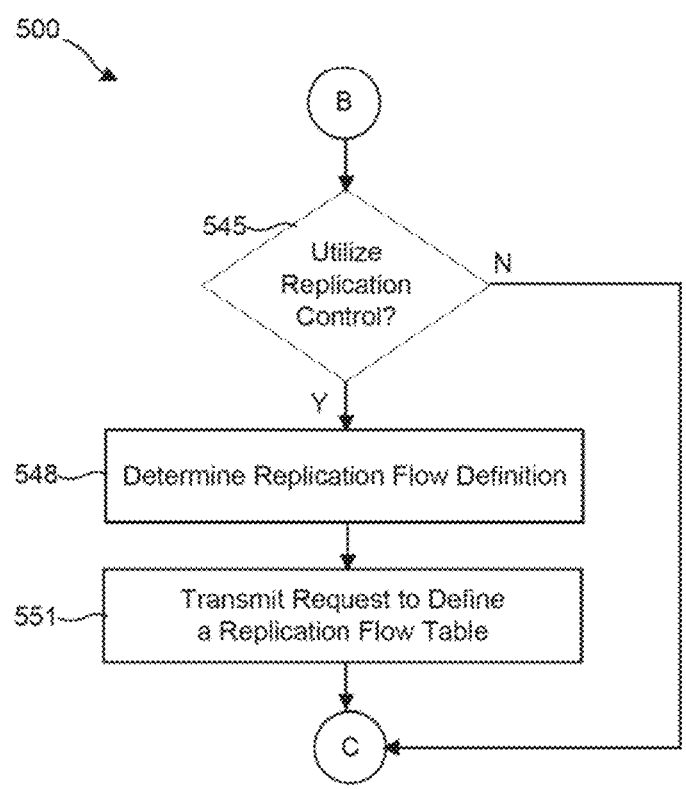

In FIG. 5, shown is an example flowchart 500 describing steps that can be performed by the components of the networked environment 100 of FIG. 1. Generally, the flowchart 500 describes how the management cluster 130 executing the SDDC manager 203 provides network resource management. In some cases, some of the steps performed in FIG. 5 can be considered part of the replication control application 215 of the SDDC manager 203.

In step 545, the SDDC manager 203 can determine whether to utilize replication control. The SDDC manager 203 can determine whether the switches 115 and/or 121 support replication control. Further, the SDDC manager 203 can obtain authorization to use replication control through a user interface of the SDDC manager 203. The SDDC manager 203 can search data associated with the switches 115 and/or 121 and determine that the switches support a communications protocol that supports replication control using a replication flow definition. For example, the SDDC manager 203 can identify that the switches 115A and 115B support OpenFlow®, or another communications protocol that supports replication control. An OpenFlow® Switch can communicated with a controller using the OpenFlow protocol that can define messages including packet-received, send-packet-out, modify-forwarding-table, and get-stats. In some cases, the SDDC manager 203 can perform the controller function, or can communicate with the controller.

In step 548, the SDDC manager 203 can generate or determine a replication flow definition. The replication flow definition can define what actions the at least one of the switches 115 should take for data that is to be replicated. For example, the replication definition can be designed to cause the switch 115A to identify tagged data for replication or disaster recovery, and perform the defined actions of the flow definition.

In step 551, the SDDC manager 203 can transmit a request to define a replication flow table within the switch 115A, and to other switches. The request can cause the switch 115A to define the replication flow table using the actions defined within the replication flow definition. In some cases, the flow table can include a set of packet or data fields to match, and an action like send-out-port, modify, or drop when the fields match. When a switch receives a packet or other data it has never seen before, and for which it has no matching flow table entries, it can send this packet to the SDDC manager 203 or another controller. The controller then makes a decision on how to handle this packet; it can drop the packet, or it can add a flow entry directing the switch on how to forward similar packets in the future.

Once tagged data is identified using the flow table, the switch 115A can determine or identify destination hosts for tagged data, generate replicated versions of the tagged data, and transmit the replicated versions of the tagged data to the destination hosts. Accordingly, the hosts can send tagged data once, and allow a switch to replicate and transmit it, rather than having the host send the data to the switch for each of the destination hosts, reducing traffic through the switch.

Figure 6:
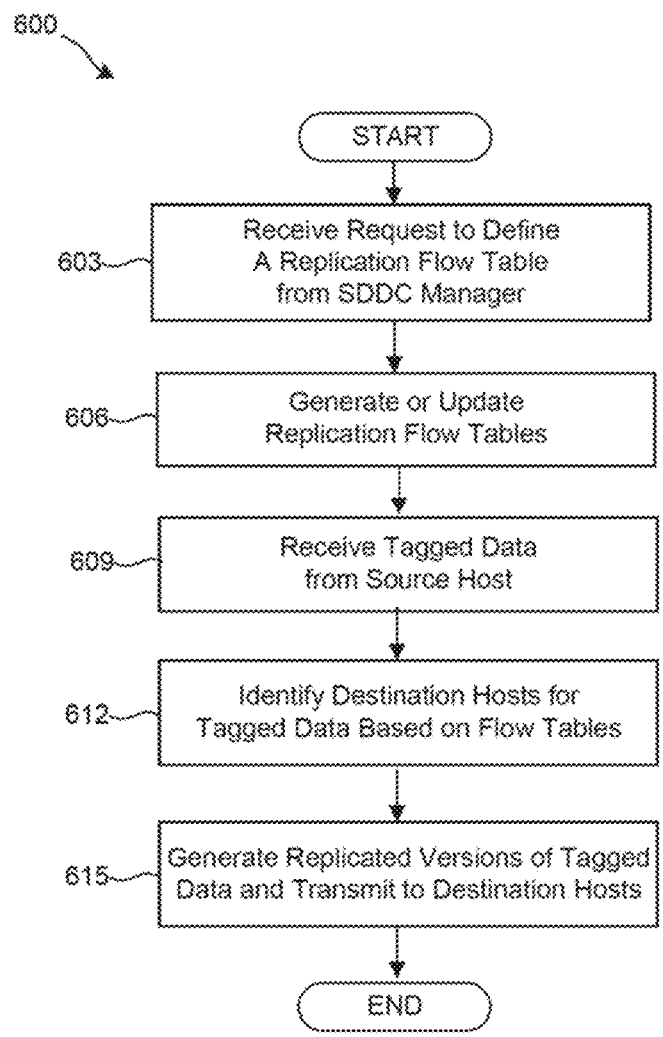

In FIG. 6, shown is an example flowchart 600 describing steps that can be performed by the components of the networked environment 100 of FIG. 1. Generally, the flowchart 600 describes how a switch or other network device provides network resource management functionality as defined or controlled by the SDDC manager 203. While discussed regarding the switch 115A for clarity, any of the switches of the networked environment can also perform the steps of the flowchart 600. In some cases, the switch 115A can support OpenFlow®, or another communications protocol that supports replication control or other flow definitions.

In step 603, the switch 115A can receive a request to define a replication flow table from the SDDC manager 203. The request can include replication flow definition that defines what actions the switch 115A should take for data that is to be replicated. For example, the replication definition can be designed to cause the switch 115A to identify tagged data for replication or disaster recovery, and perform the defined actions of the replication flow definition generated by the SDDC manager 203.

In step 606, the switch 115A can generate or update one or more replication flow table. The flow table can be generated or updated using the replication flow definition. The switch 115A can store the generated or updated replication flow table within a data store or other memory of the switch 115A.

In step 609, the switch 115A can receive tagged data for replication. The tagged data can include a header that identifies that the tagged data is for replication. For example, the header can be in a particular format, and can include a particular string, flag, or another identifier within the header that identifies that the tagged data is for replication.

In step 612, once the tagged data is received, the switch 115A can identify or determine destination hosts for tagged data, for example, for disaster recovery. The switch 115A can compare the tagged data, including the header, to at least one flow table within the switch 115A. The data within the header can include an identity or an address of destination hosts, or the switch 115A can determine the destination hosts based on the header, the flow table, the source of the tagged data, or other information.

In step 615, the switch 115A can generate replicated versions of the tagged data. The replicated versions of the tagged data can include modified header data. The switch 115A can reference the flow table to identify a modification to the header data, or a new header to include within the replicated versions of the tagged data. Once the replicated versions of the tagged data are generated, the switch 115A can transmit the replicated versions of the tagged data to the identified destination hosts for backup, disaster recovery, or other purposes. Accordingly, tagged data can be sent once and the switch 115A can be instructed to replicate and transmit it, rather than receiving the tagged data at the switch for each copy sent to the destination hosts, reducing traffic through the switch 115A.

Figure 7:
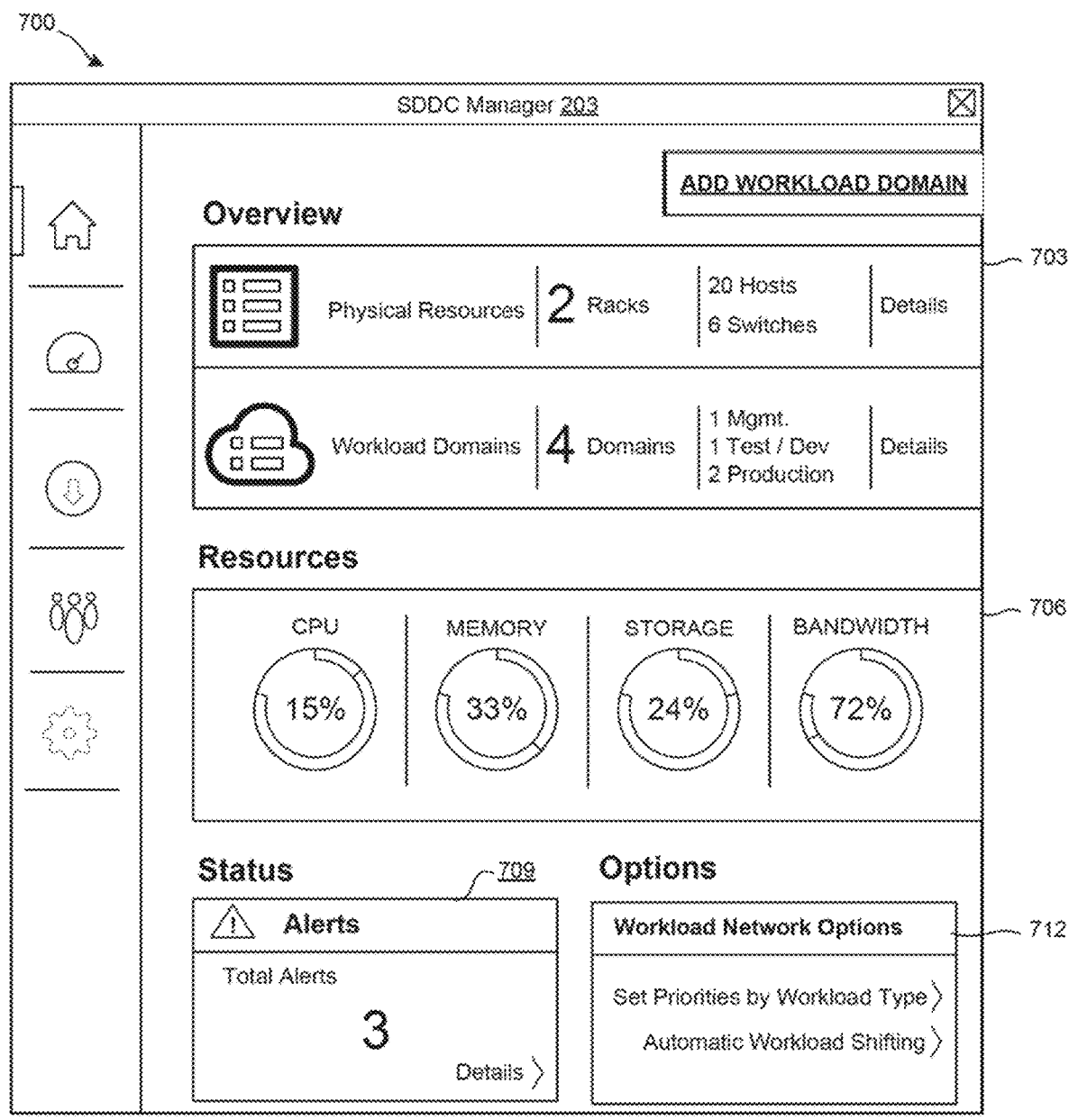
FIGS. 7-8 are drawings illustrating functionalities implemented by components of the networked environment and rendered for display.

With reference to FIG. 7, shown is an example illustration of a user interface 700 generated by the SDDC manager 203 and displayed on a display device. The user interface 700 can show information regarding components of the networked environment 100. The user interface can have a number of areas including an overview pane 703, a resources pane 706, a status pane 709, and an options pane 712.

The overview pane 703 can show information about physical resources, workload domains, and other information. The SDDC manager 203 can determine and update all information in the user interface 700 constantly, periodically, or when new hosts are added to racks or workload domains are added or deleted. The overview pane 703 can indicate that physical resources include two racks, twenty hosts, and six switches are installed or available, for example, in the site 107. While four switches 115A, 115B, 121A, and 121B are shown in FIG. 1, the site 107 can include additional switches, including spine switches and other switches of the site 107. The site 107 can include two spine switches, in some situations. The overview pane 703 can also include a user interface element that when selected causes details regarding the physical resources to be shown. Details can, for example, indicate that 15 of the 20 available hosts are currently assigned to workload domains, and can provide hardware specifications for each of the hosts, as well as hardware specification aggregates for all available hosts and additional information.

The overview pane 703 can also indicate that there are four workload domains including one management workload domain, one test and development workload domain, and two production workload domains. The overview pane 703 can also include a user interface element that when selected causes details regarding the workload domains to be shown. Details can, for example, indicate that the management cluster 130 is a management workload domain type and the hosts 118A-118C are assigned to it, the workload domain 133 is a production workload domain that has been assigned hosts 118D-118E and 124G-124H, the workload domain 136 is a production workload domain that has been assigned hosts 118F-118G and 124E-124F, and the workload domain 139 is a test and development workload domain that has been assigned hosts 118I-118L.

The resources pane 706 can include a snapshot of current resource usage including compute (CPU), memory, storage, and bandwidth usage. As shown, the resources pane can show that 15% of the compute resources, 33% of the memory resources, 24% of the storage resources, and 72% of the bandwidth resources are being used. An administrator can quickly recognize usage in order to make decisions regarding expansion. The SDDC manager 203 can utilize this and more detailed information to assign and shift workload domains, throttle workload domains, and otherwise provide management of the physical resources and workload domains.

The status pane 709 can indicate that there are three total alerts. The status pane 709 can also include a user interface element that when selected causes details regarding the alerts or other status items to be shown. For example, a threshold can be set to cause an alert when bandwidth has gone over a predetermined level or percentage of total.

The options pane 712 can provide access to workload domain network options and settings. For example, options pane 712 can include a user interface element that when selected allows an administrator to set priorities of particular workload domain types or particular workload domains. The options pane can further include a user interface element that when selected allows an administrator to enable, disable, or set a configuration for automatic workload domain shifting. For instance, workload shifting can be enabled for according to particular workload domains or certain workload domain types.

Figure 8:
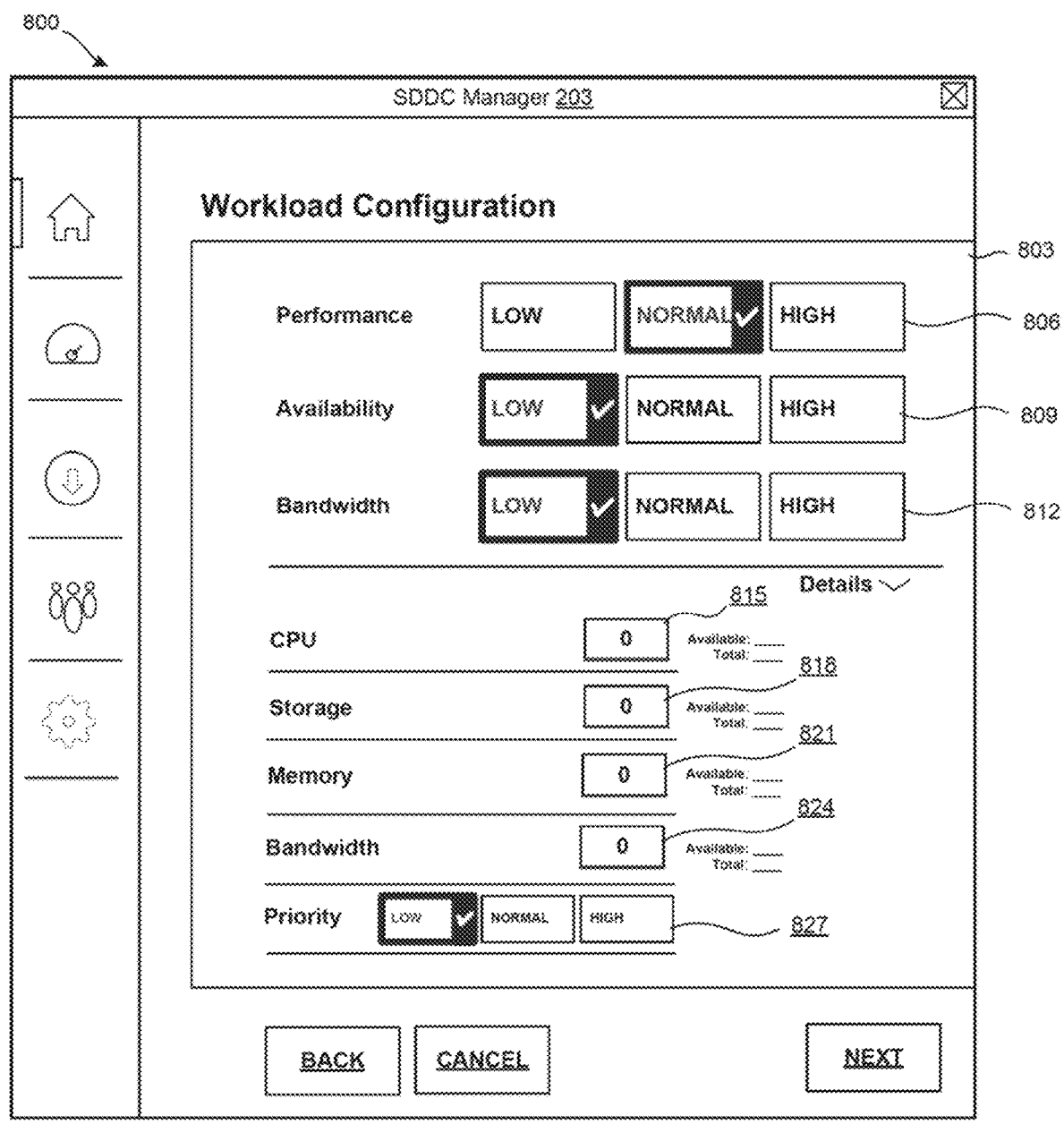

With reference to FIG. 8, shown is an example illustration of a user interface 800 generated by the SDDC manager 203 and displayed on a display device. The user interface 800 can include a workload configuration pane 803 that can be utilized to configure a workload domain, like an existing workload domain or a new workload domain. The workload configuration pane 803 can include user interface elements 806, 809, 812, 815, 818, 821, 824, and 827.

The user interface elements 806, when activated, can set or configure the workload domain to have a particular performance. Performance can be a general term that can indicate or communicate that compute, memory, storage, and other resources can be adjusted by the user. In one situation, "Low," "Normal," or "High" performance settings are selectable. Each performance setting can have predefined compute, memory, storage, and other resource settings associated with each selectable performance setting.

The user interface elements 809, when activated, can set or configure the workload domain to have a particular availability. Availability can be a general term that can indicate or communicate a level of or number of failures, such as hardware failures, that can be tolerated before the workload domain functionality is compromised. In one situation, "Low," "Normal," or "High" availability settings are selectable. Each availability setting can have predefined availability setting associated with each selectable availability setting. For example, availability settings can configure a number of backups or mirrors are made of the workload domain for disaster recovery. Also, these settings can configure whether the mirrors have all of the compute, memory, and bandwidth resources of the active site, or, for example, only backup the data, applications, and tasks while having lesser overall compute, memory, storage, and bandwidth settings.

The user interface elements 812, when activated, can set or configure the workload domain to have a particular bandwidth. Bandwidth can be a general term that can indicate or communicate that bandwidth, dedicated bandwidth, number of switches, switch buffer, and other network bandwidth resources can be adjusted by the user. In one situation, "Low," "Normal," or "High" bandwidth settings are selectable. Each performance setting can have predefined expected bandwidth, dedicated bandwidth, number of switches, switch buffer, and other network bandwidth resource settings associated with each selectable bandwidth setting. For example, the "High" bandwidth setting can indicate a particular expected bandwidth and a particular dedicated bandwidth. In some cases, this bandwidth setting can indicate that all of the expected bandwidth is dedicated bandwidth, or that a predefined portion of the expected bandwidth is dedicated bandwidth. The "Normal" bandwidth setting can indicate a lower expected bandwidth and a lower dedicated bandwidth, or no dedicated bandwidth, and so on.

The user interface element 815, when activated, can allow a user to enter or adjust a specific compute or CPU hardware setting, for example, using gigahertz, terahertz, number of processors, or other units and specifications. The user interface element 818, when activated, can allow a user to enter or adjust a specific storage hardware setting, for example, in gigabytes, terabytes, number of hard drives, type of hard drives, or other units and specifications. The user interface element 821, when activated, can allow a user to enter or adjust a specific memory setting in gigabytes, terabytes, megahertz, gigahertz, number of memory units, or other units and specifications. The user interface element 824, when activated, can allow a user to enter or adjust a specific bandwidth setting in megabits per second of upload and/or download, gigabits per second of upload and/or download, or other units and specifications.

The user interface elements 827, when activated, can set or configure the workload domain to have a particular priority. In one situation, "Low," "Normal," or "High" priority settings are selectable. Further delineations such as workload domain type can also be set of configured using user interface elements 827 or other user interface elements.

A number of software components are stored in the memory and executable by a processor. In this respect, the term "executable" means a program file that is in a form that can ultimately be run by the processor. Examples of executable programs can be a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

A client device having a display can also be utilized, upon which a user interface generated by the SDDC manager 203, the workload tasks 224, workload tasks 227, workload tasks 230, or another application can be rendered. The client device can also include one or more input/output devices that can include, for example, a capacitive touchscreen or other type of touch input device, fingerprint reader, or keyboard.

Although the SDDC manager 203, workload tasks 224, workload tasks 227, workload tasks 230, or another applications and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a computer-readable medium can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

What is claimed is:

1. A computer-implemented method, comprising:
monitoring, by at least one computing device comprising at least one of a plurality of hosts within a hyper-converged infrastructure, network traffic associated with a plurality of top-of-rack (TOR) switches comprising a first set of TOR switches of a first rack, and a second set of TOR switches of a second rack;
determining, by the at least one computing device, a first available bandwidth of the first set of TOR switches, and a second available bandwidth of the second set of TOR switches, based at least in part on the network traffic and a respective hardware specification of the TOR switches; and
distributing, by the at least one computing device, a workload domain to a first host of the first rack and a second host of the second rack based at least in part on the first available bandwidth of the first set of TOR switches, the second available bandwidth of the second set of TOR switches, and an expected bandwidth of the workload domain.

2. The computer-implemented method of claim 1, further comprising:
determining, by the at least one computing device, that a workload domain comprising at least one of the plurality of hosts is a low-priority workload domain; and
throttling, by the at least one computing device, the low-priority workload domain.

3. The computer-implemented method of claim 2, wherein determining that the workload domain is a low-priority workload domain uses data that defines a type of the workload domain.

4. The computer-implemented method of claim 2, further comprising transmitting, by the at least one computing device, a request to throttle the low-priority workload domain to at least one host assigned to the low-priority workload domain, the request to throttle the low-priority workload domain comprising data that specifies a bandwidth limit.

5. The computer-implemented method of claim 2, further comprising reducing, by the at least one computing device, a queue length within at least one host assigned to the low-priority workload domain to throttle the low-priority workload domain.

6. The computer-implemented method of claim 1, further comprising:
receiving, by at least one of the plurality of switches, tagged data comprising a header that identifies that the tagged data is for replication;
generating, by the at least one of the plurality of switches, replicated versions of the tagged data, the replicated versions comprising modified header data; and
transmitting, by the at least one of the plurality of switches, the replicated versions of the tagged data to a plurality of destination hosts.

7. The computer-implemented method of claim 1, further comprising defining, by the at least one computing device, a flow table within at least one of the plurality of switches, wherein the flow table is defined using a request that is transmitted to the at least one of the plurality of switches from a management cluster comprising at least one of the plurality of hosts.

8. A system, comprising:
at least one computing device comprising at least one of a plurality of hosts within a hyper-converged infrastructure; and
program instructions executable in the at least one computing device that, when executed, cause the at least one computing device to:
monitor network traffic associated with a plurality of top-of-rack (TOR) switches comprising a first set of TOR switches of a first rack, and a second set of TOR switches of a second rack;
determine a first available bandwidth of the first set of TOR switches, and a second available bandwidth of the second set of TOR switches, based at least in part on the network traffic and a respective hardware specification of the TOR switches; and
distribute a workload domain to a first host of the first rack and a second host of the second rack based at least in part on the first available bandwidth of the first set of TOR switches, the second available bandwidth of the second set of TOR switches, and an expected bandwidth of the workload domain.

9. The system of claim 8, wherein when executed the program instructions further cause the at least one computing device to:
determine that a workload domain comprising at least one of the plurality of hosts is a low-priority workload domain; and
throttle the low-priority workload domain.

10. The system of claim 9, wherein when executed the program instructions further cause the at least one computing device to determine that the workload domain is a low-priority workload domain using data that defines a type of the workload domain.

11. The system of claim 9, wherein when executed the program instructions further cause the at least one computing device to transmit a request to throttle the low-priority workload domain to at least one host assigned to the low-priority workload domain, the request to throttle the low-priority workload domain comprising data that specifies a bandwidth limit.

12. The system of claim 9, wherein when executed the program instructions further cause the at least one computing device to reduce a queue length within at least one host assigned to the low-priority workload domain to throttle the low-priority workload domain.

13. The system of claim 8, wherein the at least one computing device further comprises at least one of the plurality of switches, and when executed the program instructions further cause the at least one computing device to:
receive, by at least one of the plurality of switches, tagged data comprising a header that identifies that the tagged data is for replication;
generate, by the at least one of the plurality of switches, replicated versions of the tagged data, the replicated versions comprising modified header data; and transmit, by the at least one of the plurality of switches, the replicated versions of the tagged data to a plurality of destination hosts.

14. The system of claim 8, wherein when executed the program instructions further cause the at least one computing device to define a flow table within at least one of the plurality of switches, wherein the flow table is defined using a request that is transmitted to the at least one of the plurality of switches from a management cluster comprising at least one of the plurality of hosts.

15. A non-transitory computer-readable medium embodying program instructions executable in at least one computing device comprising at least one of a plurality of hosts within a hyper-converged infrastructure, wherein when executed the program instructions cause the at least one computing device to:
- monitor network traffic associated with a plurality of top-of-rack (TOR) switches comprising a first set of TOR switches of a first rack, and a second set of TOR switches of a second rack;
- determine a first available bandwidth of the first set of TOR switches, and a second available bandwidth of the second set of TOR switches, based at least in part on the network traffic and a respective hardware specification of the TOR switches; and
- distribute a workload domain to a first host of the first rack and a second host of the second rack based at least in part on the first available bandwidth of the first set of TOR switches, the second available bandwidth of the second set of TOR switches, and an expected bandwidth of the workload domain.

16. The non-transitory computer-readable medium of claim 15, wherein when executed the program instructions further cause the at least one computing device to:
- determine that a workload domain comprising at least one of the plurality of hosts is a low-priority workload domain; and
- throttle the low-priority workload domain.

17. The non-transitory computer-readable medium of claim 16, wherein when executed the program instructions further cause the at least one computing device to determine that the workload domain is a low-priority workload domain using data that defines a type of the workload domain.

18. The non-transitory computer-readable medium of claim 16, wherein when executed the program instructions further cause the at least one computing device to transmit a request to throttle the low-priority workload domain to at least one host assigned to the low-priority workload domain, the request to throttle the low-priority workload domain comprising data that specifies a bandwidth limit.

19. The non-transitory computer-readable medium of claim 16, wherein when executed the program instructions further cause the at least one computing device to reduce a queue length within at least one host assigned to the low-priority workload domain to throttle the low-priority workload domain.

20. The non-transitory computer-readable medium of claim 15, wherein when executed the program instructions further cause the at least one computing device to:
- receive, by at least one of the plurality of switches, tagged data comprising a header that identifies that the tagged data is for replication;
- generate, by the at least one of the plurality of switches, replicated versions of the tagged data, the replicated versions comprising modified header data; and
- transmit, by the at least one of the plurality of switches, the replicated versions of the tagged data to a plurality of destination hosts.

* * * * *